(12) United States Patent
Komatsu et al.

(10) Patent No.: US 7,399,792 B2
(45) Date of Patent: Jul. 15, 2008

(54) SOLID REAGENTS

(75) Inventors: Makoto Komatsu, Kanagawa (JP); Kazuyoshi Takeda, Kanagawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 11/366,467

(22) Filed: Mar. 3, 2006

(65) Prior Publication Data

US 2006/0148998 A1      Jul. 6, 2006

Related U.S. Application Data

(62) Division of application No. 10/617,025, filed on Jul. 11, 2003.

(30) Foreign Application Priority Data

| Jul. 12, 2002 | (JP) | ............................... 2002/204007 |
| Jul. 8, 2003 | (JP) | ............................... 2003/271893 |

(51) Int. Cl.
*C08F 291/00* (2006.01)
*C08J 7/18* (2006.01)

(52) U.S. Cl. .................... 521/30; 525/240; 525/64; 525/69; 525/71; 525/89; 525/326.4; 525/326.6; 525/326.9; 525/327.1; 522/113; 522/149; 522/150; 522/161

(58) Field of Classification Search ............... 525/240, 525/64, 69, 71, 89, 326.1, 326.4, 326.6, 326.9, 525/327.1; 522/113, 149, 150, 161; 521/30
See application file for complete search history.

(56) References Cited

U.S. PATENT DOCUMENTS

| 3,880,736 | A |   | 4/1975 | Garnett et al. |
| 5,643,968 | A | * | 7/1997 | Andreola et al. ............. 521/27 |
| 5,648,400 | A |   | 7/1997 | Sugo et al. |
| 5,863,654 | A |   | 1/1999 | Frey et al. |
| 6,028,172 | A |   | 2/2000 | Stepaniuk et al. |
| 6,117,543 | A |   | 9/2000 | Zaima et al. |
| 6,228,135 | B1 |  | 5/2001 | Sugo et al. |
| 6,297,186 | B1 |  | 10/2001 | Kobayashi |
| 6,376,419 | B1 |  | 4/2002 | Kobayashi |
| 6,703,432 | B1 |  | 3/2004 | Fujiwara et al. |
| 6,811,771 | B1 |  | 11/2004 | Sugo et al. |
| 6,844,371 | B1 |  | 1/2005 | Komatsu et al. |

FOREIGN PATENT DOCUMENTS

| DE | 40 28 326 | 3/1991 |
| WO | 99/32705 | 7/1999 |
| WO | 01/29105 | 4/2001 |

OTHER PUBLICATIONS

Andreas Kirschning, et al., "Functionalized Polymers—Emerging Versatile Tools for Solution-Phase Chemistry And Automated Parallel Synthesis", Angew. Chem., Int. Ed., 40, pp. 650-679, 2001.

Stephen J. Shuttleworth, "Functionalised Polymers in Organic Chemistry; Part 2", Synthesis, No. 8, pp. 1035-1074, 2000.

Database WPI, Section Ch, Week 199516 Derwent Publications, Ltd., London, Great Britain, AN 1995-118762 XP002263135 & JP 07 041574 A (Asahi Kasei Kogyo KK), Feb. 10, 1995.

* cited by examiner

*Primary Examiner*—Randy Gulakowski
*Assistant Examiner*—Olga Asinovsky
(74) *Attorney, Agent, or Firm*—Wenderoth, Lind & Ponack, LLP

(57) ABSTRACT

An object of the present invention is to provide a novel solid reagent capable of solving the problems of conventional solid reagents based on resin beads.

The present invention relates to a solid reagent comprising an organic polymer base in which a polymer side chain is introduced onto the backbone of the organic polymer base via graft polymerization and a reactive functional group is introduced onto the polymer side chain. The organic polymer base is preferably in the form of a fiber, a woven or nonwoven fabric consisting of an assembly of fibers, a porous membrane or a hollow fiber membrane. The graft polymerization is preferably a radiation-induced graft polymerization. Solid reagents according to the present invention can be used in various organic synthetic reactions.

12 Claims, 3 Drawing Sheets

SOLID REAGENTS

This application is a divisional of U.S. application Ser. No. 10/617,025, filed Jul. 11, 2003.

BACKGROUND OF THE INVENTION

The present invention relates to so-called solid reagents (also referred to as polymer-bound reagents or polymer-supported reagents).

Many reagents used in various organic syntheses such as oxidizing agents, reducing agents, deprotonating agents, halogenating agents and nucleophilic displacing agents are hard to handle because of their properties such as toxicity, combustibility, volatility and corrosiveness. They are sometimes poor in the yield or selectivity of target compounds. Moreover, common reagents are mixed with a starting material in a solvent for a desired reaction so that they require complex operations such as extraction, filtration, drying and purification in order to remove unreacted reagents and by-products from the medium and to isolate only a target compound after the reaction, and many of them have the problem that they generate a large volume of waste.

As one of means for solving or reducing these problems, solid reagents have been developed in which a reactive functional group or a reagent compound itself is immobilized on a carrier such as silica gel or a polymer resin.

Polymer resins have found a wide range of applications in chemical syntheses since Merrifield proposed application for peptide synthesis in the 1970s. Among others, many reports proposed using polymer resins as carriers for solid reagents, as introduced in reviews such as Angew. Chem. Int. Ed., 40, 650 (2001), Synthesis, No.8, 1035 (2000).

The use of solid reagents in organic syntheses generally has the following advantages. They are safer and easier to handle than conventional equivalent reagents (liquid or gaseous reagents); target compounds can be obtained with high yield by excessively using such reagents; and unreacted and reacted reagents and target compounds can be readily separated by filtration after the reaction has been completed. Many of them further have the following advantages. Some kinds of solid reagents afford target compounds with higher selectivity than conventional equivalent reagents; target compounds can be obtained only by passing a solution of a starting compound through a column packed with a solid reagent; and solid reagents can be regenerated/reused. It can be said from these facts that processes using solid reagents are environment-conscious. Solid reagents may be used by passing a solution of a starting compound through a bed of a solid reagent as described above or by passing a gas of a starting compound through a bed of a solid reagent, though the following description is limited to the mode in which a solution is passed for convenience sake. However, solid reagents including those of the present invention naturally cover the application mode in which a raw material gas is passed and such a mode is also included in the scope of the present invention.

Some of these results have already been commercialized. For example, some of ion exchange resins commercially available under Amberlyst have been converted from salt forms to have functions as oxidizing agents, reducing agents, various halogenating agents or nitrating agents. Polymer resins other than ion exchange resins are also commercially available such as polystyrene resins supporting osmium tetraoxide that was previously difficult to handle (from Wako Pure Chemical Industries, Ltd.).

However, all these conventional solid reagents have the problem that they are liable to physical wear/strength reduction during use because they use polymer resins prepared with crosslinkers (crosslinked polymers) as carriers, which change in volume by swelling or contraction.

Moreover, molecules of a starting compound and reactive functional groups or reagent compound molecules supported on a solid reagent must come into thorough contact with each other in order that a chemical reaction may proceed, but conventional solid reagents generally use porous bead-like resins so that molecules of a starting compound must be diffused for access to reactive functional groups or reagent compound molecules supported on the inner surfaces of micropores of the porous resin beads in order that a desired chemical reaction may proceed, which greatly impedes smooth progress of the chemical reaction.

Furthermore, the starting material solution must be passed at an extremely slow flow rate, and therefore over a very long time when conventional solid reagents are to be used in large-scale column reactions. If the flow rate is increased in this case, the starting compound cannot be sufficiently diffused into the interior side of resin beads, which results in an extremely lowered utilization efficiency of reactive functional groups or reagent compound molecules and therefore a decreased yield of the target compound.

The utilization efficiency of reactive functional groups or reagent compound molecules may be increased by reducing the particle diameter of resin beads or further increasing the surface area, but serious pressure loss (differential pressure) in large-scale reactor systems requires considerable strength in reactors or pumps.

For the reasons described above, conventional solid reagents often had further problems associated with regeneration of used reagents, such as lengthy regeneration procedures, need for large amounts of regenerants and low regeneration efficiency.

Consequentially, very few solid reagents are actually used in industrial chemical processes because of the inevitable problem of the poor cost performance for use in industrial chemical processes despite great many proposals of solid reagents as introduced in the review mentioned above.

Several means to solve the above problems were proposed from the aspect of hardware such as reaction vessel or reaction apparatus, but solid reagents optimized for synthetic procedures have been still insufficiently developed.

SUMMARY OF THE INVENTION

As a result of careful studies to develop a novel solid reagent capable of solving the problems of conventional solid reagents based on resin beads, we found that a solid reagent with very excellent properties can be obtained by forming a polymer side chain having a reactive functional group on the backbone of a polymer base having no crosslinked structure such as a fiber or a woven or nonwoven fabric via graft polymerization and finally accomplished the present invention.

Accordingly, the present invention relates to a solid reagent comprising a polymer base in which a polymer side chain is introduced onto the backbone of the organic polymer base via graft polymerization and a reactive functional group is introduced onto the polymer side chain.

As used herein, the term "solid reagent" means such a reagent that reacts stoichiometrically with a starting compound by contact with the starting compound and is consumed along the progress of the reaction to undergo changes in functional groups and thus lose reactivity as a reagent, but it can recover reactivity by restoring the functional groups with a regenerant as appropriate and it should be differentiated from "solid catalysts" that themselves remain unchanged along the progress of the reaction or "sustained-release drugs" that are designed to gradually release functional group moieties without contact with a starting compound as its reaction partner.

DETAILED DESCRIPTION OF THE INVENTION

Figure 1:
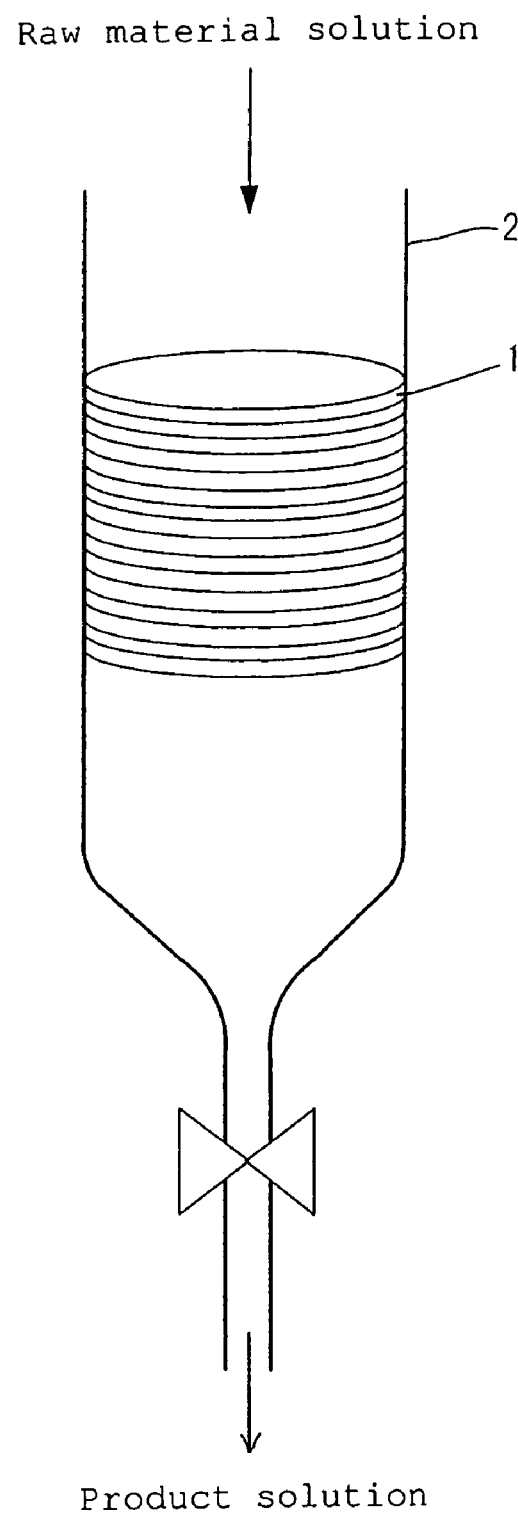
FIG. 1 shows an example of a reactor according to the present invention.

Various aspects of the present invention are explained in detail below.

Organic polymer bases for forming solid reagents of the present invention are preferably polyolefin-based organic polymer bases. Polyolefin-based organic polymer bases are suitable for the purpose of introducing a graft side chain via radiation-induced graft polymerization described below because they are not degradable by radiations. Specific examples of polyolefin-based polymer materials well suitable for use as organic polymer bases in the present invention include, but not limited to, polyolefins such as polyethylene and polypropylene; halogenated polyolefins such as PTFE and vinyl chloride; and olefin-halogenated olefin copolymers such as ethylene-ethylene tetrafluoride copolymers and ethylene-vinyl alcohol copolymers (EVA). These organic polymer bases can be preferably used in the form of a fiber, a woven or nonwoven fabric consisting of an assembly of fibers, a porous membrane or a hollow fiber membrane or the like.

Solid reagents of the present invention have a polymer side chain introduced onto the backbone of an organic polymer base as described above via graft polymerization and a reactive functional group introduced onto the polymer side chain. Radiation-induced graft polymerization is preferably used in the present invention. Radiation-induced graft polymerization is a method that allows a desired graft polymer side chain to be introduced into an organic polymer base by irradiating the base to produce radicals and reacting them with a graft monomer, and this method is most preferred for the purpose of the present invention because polymer side chains can be introduced into existing polymer materials in various shapes.

Radiations that can be used in radiation-induced graft polymerization include α-rays, β-rays, γ-rays, electron rays, UV ray, etc., among which γ-rays and electron rays are well suitable for use in the present invention. Radiation-induced graft polymerization includes preirradiation graft polymerization involving preliminarily irradiating a graft base and then bringing it into contact with a polymerizable monomer (graft monomer) for reaction, and simultaneous irradiation graft polymerization involving simultaneously irradiating a base and a monomer, and either method can be used in the present invention. Radiation-induced graft polymerization includes various manners of contact between a monomer and a base, such as liquid phase graft polymerization performed with a base immersed in a monomer solution, gas phase graft polymerization performed with a base in contact with the vapor of a monomer, or immersion gas phase graft polymerization performed by immersing a base in a monomer solution and then removing it from the monomer solution for reaction in a gas phase, and any method can be used in the present invention.

As described above, fibers and woven/nonwoven fabrics consisting of an assembly of fibers are suitable materials for use as organic polymer bases for forming solid reagents of the present invention, and these are well suitable for use in the immersion gas phase graft polymerization because they tend to retain monomer solutions.

In the preparation of solid reagents of the present invention, a polymerizable monomer having a carbon-carbon double bond and having a functional group capable of being converted into a reactive functional group participating in a desired chemical reaction is used as a graft monomer in a reaction for introducing a polymer side chain onto the backbone of an organic polymer base (graft polymerization reaction). Such polymerizable monomers include e.g. styrene, chloromethylstyrene, 4-vinylpyridine, acrylic acid, acrylonitrile, etc. Solid reagents of the present invention can be formed by graft-polymerizing such a polymerizable monomer onto the backbone of an organic polymer base preferably via radiation-induced graft polymerization to form a side chain and then converting the functional group on the polymer side chain into a reactive functional group participating in a desired chemical reaction by a known method. According to the present invention, solid reagents that can participate in reactions such as oxidation reactions, reduction reactions, deprotonation reactions, halogenation reactions and nucleophilic displacement reactions are provided.

Further, in the preparation of solid reagents of the present invention, a polymerizable monomer having a carbon-carbon double bond and having a reactive functional group participating in a desired chemical reaction may also be used as a graft monomer. In this case, the solid reagents having graft polymer side chain having a desired reactive functional group on the backbone may be formed by graft-polymerizing such a polymerizable monomer onto the backbone of an organic polymer base. Polymerizable monomers which can be used in this purpose include e.g. 4-vinylbenzyltrimethylammonium salt, etc.

The present invention also relates to processes for preparing solid reagents as described above. Accordingly, another aspect of the present invention relates to a process for preparing a solid reagent comprising graft-polymerizing a polymerizable monomer having a reactive functional group onto the backbone of an organic polymer base to form a polymer side chain having the reactive functional group. The present invention also relates to a process for preparing a solid reagent, comprising graft-polymerizing a polymerizable monomer having a group capable of being converted into a reactive functional group onto the backbone of an organic polymer base to form a polymer side chain and then converting the group capable of being converted into a reactive functional group on the polymer side chain into the reactive functional group. The graft polymerization is preferably conducted via radiation-induced graft polymerization.

In a specific embodiment of the process for preparing a solid reagent according to the present invention, solid reagents of the present invention serving as reagents for oxidation reactions can be formed by graft-polymerizing chloromethylstyrene used as a polymerizable monomer onto an organic polymer base such as a polyethylene nonwoven fabric via radiation-induced graft polymerization to form a polymer side chain, then immersing the base in a solution of a trialkylamine such as trimethylamine to introduce a quaternary ammonium-type anion exchange group onto the polymer side chain, and converting the anion into hypochlorite ion, periodate ion, peroxide ion, chromate ion, dichromate ion, perruthenate ion, etc. Solid reagents of the present invention serving as reagents for reduction reactions can be formed by converting anion of the quaternary ammonium group introduced onto the polymer side chain into tetrahydroborate ion, cyanotrihydroborate ion, etc. Alternatively, solid reagents of the present invention that can participate as deprotonating agents in condensation reactions such as aldol condensation, Claisen condensation and Dieckmann condensation or Robinson annellation reaction can be formed by converting the anion of the quaternary ammonium group into hydroxide ion or the like. Moreover, solid reagents of the present invention serving as halogenating agents such as brominating agents can be formed by converting the anion of the quaternary ammonium group into tribromide ion or the like, or solid reagents participating in nucleophilic displacement reactions such as cyanation, thiocyanation, azidation and nitration can be formed by converting the anion of the quaternary ammonium group into cyanide ion, cyanate ion, thiocyanate ion, azide ion, nitrite ion, etc.

Alternatively, solid reagents of the present invention serving as reagents for oxidation reactions can be formed by graft-polymerizing 4-vinylpyridine used as a polymerizable monomer onto an organic polymer base such as a polyethylene nonwoven fabric via radiation-induced graft polymerization to form a polymer side chain and then immersing the base in a solution containing dichromate or chlorochromate. Solid reagents of the present invention serving as reagents for oxidation reactions can also be formed by immersing a graft base having graft-polymerized 4-vinylpyridine in a solution containing an alkyl halide such as methyl iodide to introduce a quaternary pyridinium-type anion exchange group onto the polymer side chain on the base and converting the anion into hypochlorite ion, periodate ion, chromate ion, dichromate ion, etc. Solid reagents of the present invention serving as halogenating agents such as brominating agents can be formed by converting anion of the quaternary pyridinium-type anion exchange group introduced onto the polymer side chain into bromide ion and then converting it into tribromide ion or the like.

Generally, conventional solid reagents based on polymer resin beads have reactive functional groups or reagent compound molecules immobilized onto the backbone of a polymer resin to introduce functions as reagents for various reactions and polymer backbones are crosslinked to each other to compensate for the physical strength deteriorated by the introduction of these reactive functional groups or reagent compound molecules. In conventional solid reagents based on resin beads, various reactive functional groups or reagent compound molecules are normally introduced onto the polymer chain obtained by polymerizing a monomer such as styrene. However, they have the problem that the polymer chain is solvated with molecules of the solvent used for the reaction so that it is swollen due to widened spaces between polymer chains and loses physical strength to gel or dissolve in the solvent. Thus, a crosslinker such as divinylbenzene is added to crosslink polystyrene backbones each other in order to solve this problem in conventional solid reagents based on resin beads. This increases physical strength of the resin, but causes the problem that the formation of a crosslinked structure retards the diffusion speed of the starting compound or regenerant, resulting in a decline in reaction efficiency or regeneration efficiency. Especially, conventional solid reagents are based on porous resin beads and much of the reactive functional groups or reagent compound molecules introduced are also supported on the inner surfaces of micropores of the resin. When a starting compound is passed through a column packed with such a solid reagent to induce a reaction or a regenerant is passed through it to regenerate the reagent, the starting compound solution or regenerant solution must be diffused deeply into micropores of the resin, which often causes the problem that the reactive functional groups or reagent compound molecules supported on the reagent are not sufficiently effectively utilized. If one wishes to effectively carry out a reaction using a conventional solid reagent, therefore, the starting compound must be passed extremely slowly to allow the starting compound to be sufficiently diffused into micropores of the resin. Even if the starting material solution is diffused into micropores of resin beads and reacts with reactive functional groups or reagent compound molecules to produce a target compound, the resulting target compound must be diffused from the inside to the outside of the micropores at the recovery stage of the product, which often needs continuously passing the solution over a long period after the reaction to increase recovery. In contrast, solid reagents of the present invention made it possible to increase the diffusion speed of the starting compound or regenerant while keeping the physical strength of the polymer backbone by locating a polymer side chain on the polymer backbone of an uncrosslinked organic polymer base and introducing a reactive functional group onto the polymer side chain. Thus, solid reagents of the present invention allow the reaction to proceed at a higher flow rate than previously, thereby increasing the process efficiency. Especially, solid reagents of the present invention succeeded in greatly improving reaction efficiency or regeneration efficiency because the polymer side chain has high mobility due to the absence of crosslinked structure, thereby permitting easy access of the starting compound or regenerant to any site of the polymer side chain at which the reactive functional group has been introduced as well as permitting easy recovery of the product after the reaction. In solid reagents of the present invention, the backbone plays the role of keeping physical strength or configuration.

Figure 2:
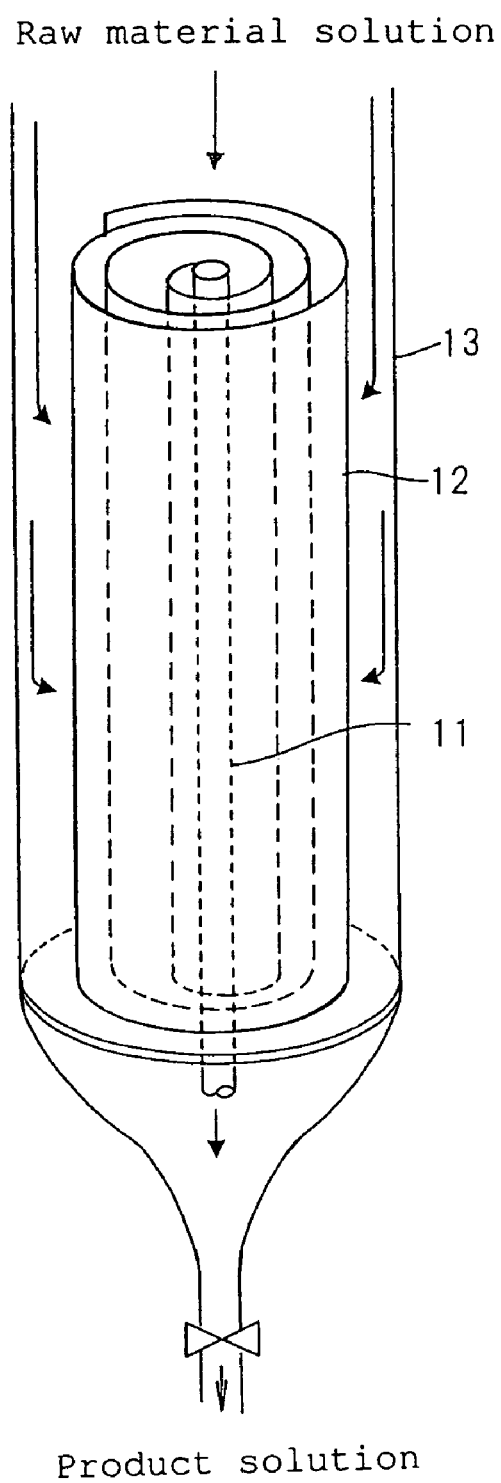
FIG. 2 shows another example of a reactor according to the present invention.

Solid reagents of the present invention can be used in e.g. a reactor comprising a column 2 packed with a number of layers of a solid reagent 1 in the form of a porous membrane or nonwoven fabric as shown in FIG. 1. A solution of a starting compound can be passed through the reactor where a desired reaction takes place to give a solution of a target compound or a regenerant can be passed through the used column to regenerate the solid reagent. Alternatively, a solid reagent of the present invention in the form of a porous membrane or nonwoven fabric can be wound into a roll 12 around a collecting tube 11 and packed in a column 13 to form a reactor as shown in FIG. 2, in which case a desired reaction can be carried out or the used reagent can be regenerated by passing a starting compound or a regenerant from the outside to the inside of roll 12.

Figure 3:
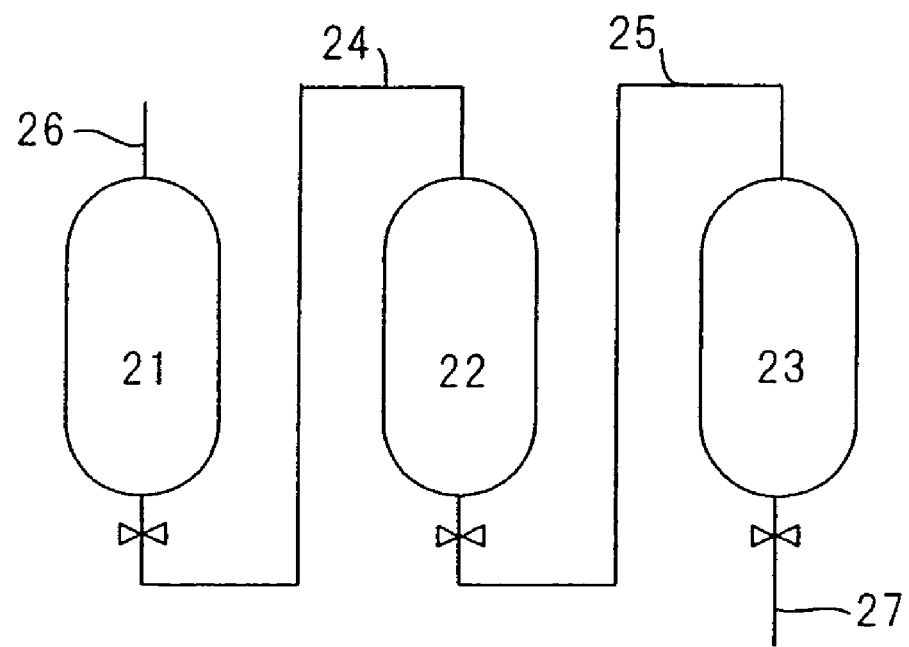
FIG. 3 shows the concept of a multistage reactor according to an embodiment of the present invention.

Moreover, different kinds of solid reagents of the present invention can be prepared and connected in series to achieve multistage synthetic reactions. As shown in FIG. 3, for example, a plurality of reaction columns 21, 22, 23 packed with solid reagents of the present invention having different functions can be prepared and connected in series via connecting pipes 24 and 25 to supply a starting compound solution from a material feeding pipe 26 to first column 21, then successively column 22 and column 23 for the subsequent reactions, whereby the final product can be recovered from product recovery pipe 27. Thus, final product D can be obtained from starting material A via multistage synthetic reactions A→B→C→D, for example.

The present invention also relates to processes and apparatus for synthesizing organic compounds as described above. Accordingly, other aspects of the present invention relates to:

A process for synthesizing an organic compound, comprising bringing a starting compound into contact with a solid reagent of the present invention;

A multistage process for synthesizing an organic compound, comprising preparing a plurality of solid reagents of the present invention having different functions and successively bringing a starting compound into contact with the plurality of solid reagents prepared;

An apparatus for synthesizing an organic compound, comprising a reaction column packed with a solid reagent of the present invention; a material feeding section for feeding a starting compound to the reaction column; and a product recovery section for recovering the organic compound produced from the reaction column; and A multistage apparatus for synthesizing an organic compound, comprising a plurality of reaction columns packed with a plurality of solid reagents of the present invention having different functions; column connecting sections for connecting the plurality of reaction columns in series; a material feeding section for feeding a starting compound to the first one of the reaction columns connected in series; and a product recovery section for recovering the organic compound produced from the last reaction column.

According to the present invention, reagents participating in various organic synthetic reactions known in the art can be provided. For example, solid reagents of the present invention having hypochlorite or periodate ion as a functional group can be used for oxidation reactions in which an alcohol is oxidized to give an aldehyde or a ketone. Solid reagents of the present invention having tetrahydroborate ion as a reactive functional group can be used for reduction reactions in which an aldehyde or a ketone is reduced to give an alcohol. Solid reagents of the present invention having a halide ion such as fluoride ion or a trihalide ion such as tribromide ion as a functional group can be used as halogenating agents in various halogenation reactions.

EXAMPLES

The following examples further illustrate the present invention. These examples are given only for illustrating some embodiments of the present invention, but are not construed to limit the invention thereto.

Example 1

Preparation of a Solid Reagent

A nonwoven fabric base made of polyethylene fibers (fiber diameter 20-30 μm; areal density 50-60 g/m²; available from Japan Vilene Co., Ltd. under product code OX-8901T6) in an amount of 20.8 g was irradiated with γ-rays at 160 kGy with cooling on dry ice. This irradiated base was immersed in chloromethylstyrene (50% m-isomer, 50% p-isomer, available from Seimi Chemical Co., Ltd. under trade name CMS-AM) preliminarily freed of polymerization inhibitors and underwent a graft polymerization reaction at 60° C. for 3 hours. The nonwoven fabric was removed and successively washed with toluene and acetone and wiped and then dried at 40° C. at normal pressure for 12 hours to give 45.5 g of a chloromethylstyrene-grafted nonwoven fabric having a grafting degree of 119%.

This grafted nonwoven fabric in an amount of 27.3 g was immersed in a mixed solution of a 30% aqueous trimethylamine solution (90 mL, 433 mmol) and pure water (400 mL) and stirred at 50° C. for 2 days. The nonwoven fabric was removed and successively washed with pure water, 0.1 N hydrochloric acid and pure water and wiped, and then dried at 60° C. at normal pressure for 12 hours to give 32.9 g of an anion exchange nonwoven fabric having an anion exchange capacity of 2.75 mmol/g-R (/g-R: per g material).

The anion exchange nonwoven fabric obtained as above (32.9 g) was immersed in a solution of sodium bromide (92.7 g, 433 mmol) dissolved in pure water (400 mL) and stirred at room temperature for 2 hours. The reaction solution was discarded and the same aqueous sodium bromide solution as above was added again and stirred for 6 hours. The nonwoven fabric was removed and washed three times with pure water (500 mL) and wiped, and then dried at 60° C. at normal pressure for 12 hours to give a $Br^-$-type anion exchange nonwoven fabric.

Thus obtained $Br^-$-type anion exchange nonwoven fabric (11.8 g) was immersed in a solution of bromine (3.7 g, 23.3 mmol) in dichloromethane (500 mL) and stirred at room temperature for 12 hours. After the reaction solution was discarded, the nonwoven fabric was washed three times with dichloromethane (500 mL) and wiped, and then dried at 40° C. at normal pressure for 2 hours to give 15.4 g of solid reagent A according to the present invention in the form of an orange nonwoven fabric. Thus obtained solid reagent A had a functional group content of 1.95 mmol/g-R.

Comparative Example 1

Preparation of a Conventional Solid Reagent Based on Resin Beads $Br^-$-type porous anion exchange resin beads (available from Sigma-Aldrich under product code 51,376-8) in an amount of 10 g were immersed in a solution of bromine (5.6 g, 35 mmol) in dichloromethane (200 mL) and shaken at room temperature for 12 hours. The reaction mixture was filtered and the resin was washed with dichloromethane, and then dried at 40° C. for 12 hours to give 15.2 g of solid reagent B in the form of orange porous resin beads. Thus obtained solid reagent B had a functional group content of 2.3 mmol/g-R and a particle diameter of 0.4-0.6 mm.

Example 2

Synthesis of 2,6-dibromo-4-methylphenol with Solid Reagent A

Round sections of 18 mm in diameter of solid reagent A were packed at a height of 50 mm in a glass column of 18 mm in inner diameter containing dichloromethane with caution to prevent air bubbles from entering the column (a total of 58 sections packed). The amount of solid reagent A packed was 3.85 g (functional group content=7.5 mmol). This column was pretreated by passing 40 mL of a dichloromethane-methanol mixed solvent (volume ratio=5:2) at a flow rate of 10 mL/min. Then, 50 mL of a solution of p-cresol in a dichloromethane-methanol mixed solvent (volume ratio=5:2) was passed using a feed pump at a given flow rate, and then a dichloromethane-methanol mixed solvent (volume ratio=5:2) was passed.

After starting to pass the p-cresol solution, a first 100 mL aliquot of effluent was concentrated under reduced pressure and combined with a 5% aqueous sodium bisulfite solution (50 mL) and extracted three times with diethyl ether (40 mL). The extract was dried over magnesium sulfate and then concentrated under reduced pressure and further concentrated via a vacuum pump. The residue was combined with an internal standard tetrachloroethane (671.4 mg, 4.0 mmol) and diluted in deuterated chloroform for $^1$H-NMR analysis to determine the recovery percentages of p-cresol, 2-bromo-4-methylphenol and 2,6-dibromo-4-methylphenol. The results are shown in Table 1.

TABLE 1

Results of Example 2

| | | | | | |
|---|---|---|---|---|---|
| Concentration of p-cresol solution (mmol/L) | | 80 | 40 | 40 | 40 |
| Amount of p-cresol added (mmol) | | 4.0 | 2.0 | 2.0 | 2.0 |
| Amount of p-cresol relative to solid reagent (equivalent) | | 0.53 | 0.27 | 0.27 | 0.27 |
| Flow rate (mL/min) | | 10.0 | 10.0 | 4.0 | 1.5 |
| Recovery (%) | p-cresol | 24 | 0 | 0 | 0 |
| | 2-bromo-4-methylphenol | 51 | 48 | 20 | 0 |
| | 2,6-dibromo-4-methylphenol | 17 | 50 | 78 | 99 |
| | Total | 92 | 98 | 98 | 99 |

Comparative Example 2

Synthesis of 2,6-dibromo-4-methylphenol with Solid Reagent B

Solid reagent B was packed at a height of 50 mm in a glass column of 18 mm in inner diameter containing dichloromethane with caution to prevent air bubbles from entering between beads. A round polyethylene nonwoven fabric of 18 mm in diameter and glass beads (1.5-2.5 mm in diameter) were overlaid in a height of 20 mm. The amount of solid reagent B packed was 7.1 g (functional group content 16.3 mmol). Then, a solution of p-cresol in dichloromethane-methanol was passed and the recovery percentage of each compound in 100 mL of effluent was determined from $^1$H-NMR in the same manner as in Example 2. The results are shown in Table 2.

TABLE 2

Results of Comparative example 2

| | | | | | |
|---|---|---|---|---|---|
| Concentration of p-cresol solution (mmol/L) | | 80 | 40 | 40 | 40 |
| Amount of p-cresol added (mmol) | | 4.0 | 2.0 | 2.0 | 2.0 |
| Amount of p-cresol relative to solid reagent (equivalent) | | 0.24 | 0.12 | 0.12 | 0.12 |
| Flow rate (mL/min) | | 10.0 | 10.0 | 4.0 | 1.5 |
| Recovery (%) | p-cresol | 2 | 2 | 0 | 0 |
| | 2-bromo-4-methylphenol | 52 | 58 | 31 | 7 |
| | 2,6-dibromo-4-methylphenol | 0 | 2 | 50 | 88 |
| | Total | 54 | 62 | 81 | 95 |

The results of Table 1 and Table 2 show that solid reagent A according to the present invention was superior in reactivity as a solid reagent despite the lower functional group content. Especially, it is shown that the target compound 2,6-dibromo-4-methylphenol was obtained at a very high yield of approximately 100% when solid reagent A was used under a low flow rate condition at 1.5 mL/min. Comparison of the results of solid reagent A and solid reagent B under the same conditions reveals that solid reagent A is superior in both of the yield of the target compound and the total recovery of whole compounds. This shows that solid reagent A based on a nonwoven fabric according to the present invention virtually eliminates the necessity for a larger amount of solvent or a lower flow rate in contrast to solid reagent B in the form of porous resin beads in which the starting material solution once diffused into micropores of the resin must be diffused again to the outside of the micropores in order to flow out from the column.

Example 3

Preparation of a Solid Reagent

The anion exchange nonwoven fabric obtained in Example 1 (6.83 g) was immersed in an aqueous 0.5% sodium boron hydride solution (200 mL) and stirred at room temperature for 1 hour in a glass ampule. The nonwoven fabric was removed and successively washed with pure water and methanol and wiped, and then dried at 50° C. for 6 hours to give 6.50 g of solid reagent C according to the present invention in the form of a white nonwoven fabric. The reduction capacity of solid reagent C determined by reaction with an excess amount of benzaldehyde was 6.96 meq/g-R. Supposing that 4 equivalents of hydride ion ($H^+$) can be released from 1 equivalent of $BH_4^-$ ion, the functional group content of $BH_4^-$ is 1.74 mmol/g-R.

Example 4

Reduction of Benzaldehyde with Solid Reagent C

In the same manner as in Example 2, disc-like sections (φ18 mm, 2.54 cm$^2$) of solid reagent C were packed in a glass column of 18 mm in inner diameter (h=28 mm, Vol.=7.3 mL, reduction capacity=6.4 mmol) and overlaid with glass beads. Thus formed liquid pass experimental apparatus is filled with ethanol and degassed, and then conditioned with ethanol. A solution of 1.6 mmol benzaldehyde in ethanol (50 mL) and then ethanol were passed. A first 100 mL aliquot of effluent was concentrated under reduced pressure and further concentrated via a vacuum pump. The residue was weighed and diluted in deuterated chloroform for $^1$H-NMR analysis to determine the recovery percentages of benzaldehyde and benzyl alcohol. The results are shown in Table 3.

TABLE 3

Results of Example 4

| | | | | |
|---|---|---|---|---|
| Equivalent of the reducing agent relative to benzaldehyde | | 4.0 | 4.0 | 4.0 |
| Flow rate (mL/min) | | 10.0 | 5.0 | 2.0 |
| Recovery (%) | Benzaldehyde | 16 | 4 | 0 |
| | Benzyl alcohol | 78 | 81 | 84 |
| | Total | 94 | 85 | 84 |

Comparative Example 3

Preparation of a Conventional Solid Reagent Based on Resin Beads $Cl^-$-type porous anion exchange resin beads (available from Rohm & Haas under trade name Amberlite IRA900J) in an amount of 5.0 g were immersed in an aqueous 0.5% sodium boron hydride solution (200 mL) and shaken at room temperature for 1 hour. The reaction mixture was filtered and the resin was washed with pure water, and then dried at 50° C. for 3 hours to give 4.9 g of solid reagent D in the form of white porous beads. Thus obtained solid reagent D had a reduction capacity of 9.76 meq/g-R as determined in the same manner as in Example 3.

Comparative Example 4

Reduction of Benzaldehyde with Solid Reagent D

Solid reagent D was packed in a glass column of 18 mm in inner diameter containing ethanol (h=9 mm, Vol.=2.3 mL, reduction capacity=6.4 mmol) with caution to prevent air bubbles from entering the column. A round polyethylene nonwoven fabric of 18 mm in diameter and glass beads were overlaid with caution to prevent air bubbles from entering the column. Then, the column was conditioned with ethanol and a solution of 1.6 mmol benzaldehyde in ethanol (50 mL) was passed, after which the recovery percentages of benzaldehyde and benzyl alcohol were determined from $^1$H-NMR in the same manner as in Example 4. Similar experiments were performed with an increased amount of solid reagent D (h=28 mm, Vol.=7.3 mL, reduction capacity=19.2 mmol). The results are shown in Table 4.

TABLE 4

Results of Comparative example 4

| | | | | |
|---|---|---|---|---|
| Equivalent of the reducing agent relative to benzaldehyde | | 4.0 | 12.0 | 12.0 |
| Flow rate (mL/min) | | 10.0 | 10.0 | 2.0 |
| Recovery (%) | Benzaldehyde | 83 | 56 | 14 |
| | Benzyl alcohol | 13 | 16 | 41 |
| | Total | 96 | 72 | 55 |

The results of Table 3 and Table 4 also show that solid reagent C according to the present invention afforded the target compound benzyl alcohol with higher yields even at higher flow rates and lower functional group contents, demonstrating that it is superior in reactivity as a solid reagent.

ADVANTAGES OF THE INVENTION

According to the present invention, solid reagents having very excellent reaction efficiency as compared with conventional solid reagents based on resin beads are provided. Solid reagents according to the present invention are useful in various organic synthetic reactions. Solid reagents according to the present invention can achieve very high utilization efficiency of functional groups carried thereon by controlling the flow rate of the starting material. Therefore, the amount of the solid reagent packed in a reaction column (functional group content) can be smaller than previously and desired compounds can be obtained with higher yield than previously.

What is claimed is:

1. A process for converting a starting compound, comprising converting the starting compound by contacting the starting compound with a solid reagent, wherein the conversion is selected from the group consisting of oxidization, reduction, halogenation and nucleophilic displacement, wherein the solid reagent comprises an organic polymer base in which a graft polymer side chain is introduced onto the backbone of the organic polymer base, wherein the graft polymer side chain has a formula:

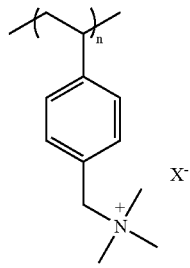

Formula (I)

wherein n is an integral equal to two or more, and

X is a reactive functional group selected from the group consisting of groups (1) to (4):

(1) hypochlorite ion, periodate ion, peroxide ion, chromate ion, dichromate ion or perruthenate ion when the conversion is oxidation;

(2) tetrahydroborate ion or cyanotrihydroborate ion when the conversion is reduction;

(3) tribromide ion when the conversion is halogenation; and (4) cyanide ion, thiocyanate ion, azide ion or nitrite ion when the conversion is nucleophilic displacement.

2. The process according to claim 1, further comprising converting the converted starting compound by contacting the starting compound with a solid reagent having a different reactive functional group from that used in the previous conversion step, wherein the further conversion is selected from the group consisting of oxidation, reduction, halogenation and nucleophilic displacement.

3. The process according to claim 1, wherein the organic polymer base is in the form of a fiber, a woven or nonwoven fabric consisting of an assembly of fibers, a porous membrane or a hollow fiber membrane.

4. The process according to claim 1, wherein the graft polymer side chain is introduced via a radiation-induced graft polymerization.

5. The process according to claim 2, wherein the organic polymer base is in the form of a fiber, a woven or nonwoven fabric consisting of an assembly of fibers, a porous membrane or a hollow fiber membrane.

6. The process according to claim 2, wherein the graft polymer side chain is introduced via a radiation-induced graft polymerization.

7. A process for converting a starting compound, comprising converting the starting compound by contacting the starting compound with a solid reagent, wherein the conversion is selected from the group consisting of oxidization, reduction, halogenation and nucleophilic displacement, wherein the solid reagent comprises an organic polymer base in which a graft polymer side chain is introduced onto the backbone of the organic polymer base, and wherein the graft polymer side chain has a formula (II):

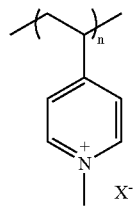

Formula (II)

wherein n is an integral equal to two or more, and
X is a reactive functional group selected from either one of the groups (1) to (4):
(1) hypochlorite ion, periodate ion, peroxide ion, chromate ion, dichromate ion or perruthenate ion when the conversion is oxidation;
(2) tetrahydroborate ion or cyanotrihydroborate ion when the conversion is reduction;
(3) tribromide ion when the conversion is halogenation; and
(4) cyanide ion, thiocyanate ion, azide ion or nitrite ion when the conversion is nucleophilic displacement.

8. The process according to claim 7, further comprising converting the converted starting compound by contacting the converted starting compound with a solid reagent having a different reactive functional group from that used in the previous conversion step, wherein the further conversion is selected from the group consisting of oxidation, reduction, halogenation and nucleophilic displacement.

9. The process according to claim 7, wherein the organic polymer base is in the form of a fiber, a woven or nonwoven fabric consisting of an assembly of fibers, a porous membrane or a hollow fiber membrane.

10. The process according to claim 7, wherein the graft polymer side chain is introduced via a radiation-induced graft polymerization.

11. The process according to claim 8, wherein the organic polymer base is in the form of a fiber, a woven.or nonwoven fabric consisting of an assembly of fibers, a porous membrane or a hollow fiber membrane.

12. The process according to claim 8, wherein the graft polymer side chain is introduced via a radiation-induced graft polymerization.

* * * * *